US007082538B2

(12) United States Patent
Bouchard et al.

(10) Patent No.: US 7,082,538 B2
(45) Date of Patent: Jul. 25, 2006

(54) ELECTRONICALLY VERIFIED DIGITAL SIGNATURE AND DOCUMENT DELIVERY SYSTEM AND METHOD

(75) Inventors: Thaddeus Bouchard, Andover, MA (US); Glenn Benson, Newton, MA (US)

(73) Assignee: Omtool, Ltd., Andover, MA (US)

( * ) Notice: Subject to any disclaimer, the term of this patent is extended or adjusted under 35 U.S.C. 154(b) by 647 days.

(21) Appl. No.: 09/970,147

(22) Filed: Oct. 3, 2001

(65) Prior Publication Data
US 2002/0091928 A1 Jul. 11, 2002

Related U.S. Application Data

(60) Provisional application No. 60/237,433, filed on Oct. 3, 2000.

(51) Int. Cl.
*H04L 9/00* (2006.01)
*H04L 9/30* (2006.01)

(52) U.S. Cl. .................. 713/181; 380/277; 380/293

(58) Field of Classification Search ................ 713/181, 713/178
See application file for complete search history.

(56) References Cited

U.S. PATENT DOCUMENTS

| 5,136,646 | A | * | 8/1992 | Haber et al. ................. 713/178 |
| 5,553,145 | A | | 9/1996 | Micali ........................... 380/30 |
| 5,615,269 | A | | 3/1997 | Micali ........................... 380/49 |
| 5,629,982 | A | | 5/1997 | Micali ........................... 380/30 |
| 5,666,420 | A | | 9/1997 | Micali ........................... 380/30 |
| 5,790,665 | A | | 8/1998 | Micali ............................ 380/4 |
| 5,812,670 | A | | 9/1998 | Micali ........................... 380/25 |
| 5,935,246 | A | | 8/1999 | Benson ......................... 713/200 |
| 5,946,396 | A | * | 8/1999 | Davis ........................... 713/178 |
| 6,047,242 | A | | 4/2000 | Benson .......................... 702/35 |
| 6,115,699 | A | | 9/2000 | Hardjono ....................... 705/51 |
| 6,119,108 | A | | 9/2000 | Holmes et al. ................ 705/40 |
| 6,134,326 | A | | 10/2000 | Micali ........................... 380/30 |

(Continued)

FOREIGN PATENT DOCUMENTS

EP  0 940 945 A2  9/1999
EP  1 113 617 A2  7/2001  ................ 9/30

OTHER PUBLICATIONS

"MIT distribution site for PGP" taken from http://web.mit.edu/network/pgp.html, printed Apr. 9, 2002 pp. 1-4.

(Continued)

*Primary Examiner*—Gilberto Barron, Jr.
*Assistant Examiner*—Venkat Perungavoor
(74) *Attorney, Agent, or Firm*—John D. Lanza

(57) ABSTRACT

The secure messaging system of the invention encrypts an electronic document using a symmetric key and transmits the encrypted document and related message parameters to a recipient whose identity is then authenticated by a web server. The web server dynamically regenerates the symmetric key from a hidden key and from the message parameters accompanying the encrypted document, and thus avoids having to maintain a central repository of encrypted documents as required by typical "post and pick-up" encrypted messaging systems. Further, an audit trail produced while practicing the invention provides timestamped message digest data for a plurality of time intervals, where the message digests for adjacent time intervals are computationally linked together. The audit trail effectively enables timestamped message digest data to verify not only the existence of a document during a first time interval, but also to verify the existence of documents encountered in a prior time interval.

10 Claims, 8 Drawing Sheets

U.S. PATENT DOCUMENTS

| | | | | |
|---|---|---|---|---|
| 6,137,884 | A | 10/2000 | Micali | 380/30 |
| 6,141,750 | A | 10/2000 | Micali | 713/168 |
| 6,182,142 | B1 | 1/2001 | Win et al. | 709/229 |
| 6,185,683 | B1 | 2/2001 | Ginter et al. | 713/176 |
| 6,301,660 | B1 | 10/2001 | Benson | 713/165 |
| 6,334,118 | B1 | 12/2001 | Benson | 705/52 |

OTHER PUBLICATIONS

"PostX Corporation—Our Solutions" taken from http://www.postx.com/technology/technology/postxsecurity/oursolutions, printed on Apr. 9, 2002, pp. 1-2.

"Tumbleweed Communication, Secure Messenger (IME)" taken from http:/tumbleweed.com/dy/print/, printed on Apr. 9, 2002, pp. 1-2.

"Tumbleweed Communications, Secure Policy Gateway" taken from http://tumbleweed.com/dy/print, printed on Apr. 9, 2002, pp. 1-3.

ZixIt, "Basic Encryption and Delivery Methods: A ZixIt Technology Primer" www.zixit.com, pp. 1-30.

ZixIt, "Email Security: The ZixMail Difference" www.zixit.com, pp. 1-12.

ZixIt, "ZixVPM—Technical White Paper" www.zixit.com, revised Jan. 2002, pp. 1-18.

"ZixMail—Encryption For Your Existing Email System" taken from http://www.zixit.com/products/products.htm, printed on Apr. 9, 2002, pp. 1-2.

ISO/IEC 9594-1, "Information technology—Open Systems Interconnection—The Directory: Overview of Concepts, models and services" International Organization for Standardization, Third Edition Dec. 15, 1998, pp. 1-20.

Menezes et al., "Handbook of Applied Cryptography," *Handbook of Applied Cryptography, CRC Press Series on Discrete Mathematics and Its Applications,* Boca Raton, FL, 1997, pp. 546-550.

Herda, "Non-repudiation: Constituting evidence and proof in digital cooperation," *Computer Standards and Interfaces,* vol. 17, No. 1, 1995, pp. 69-79.

Patent Cooperation Treaty, International Search Report, International Application No. PCT/US 01/30957, mailed on Jul. 11, 2002, 7 pages.

* cited by examiner

WIDGET, INC.                                              8 INDUSTRIAL WAY
                            334                           SALEM, NH 03079
JULY 12, 2000
                                                          603 898 0300
BOB RECIPIENT
BETTER MOUSE TRAPS, INC.
100 MAIN STREET                          ┌─────────────────────────────┐
NEWTON, MA 02465                         │ EXAMPLE OF IMPORTANT        │
                                         │ INFORMATION COVERED BY      │
DEAR BOB RECIPIENT:                      │ THE DIGITAL SIGNATURE.      │
                                         └─────────────────────────────┘
ENCLOSED PLEASE FIND THE WIDGET, INC. PRICE LIST FOR THE
WIDGET2000 PRODUCT LINE. THESE PRICES WILL REMAIN VALID
UNTIL AUGUST 1, 2000.

SINCERELY,                    ┌───────────────────────────────────────┐
                              │ BITMAP OF SIGNATURE WHICH IS          │
   *Alice Sender*             │ USED FOR DISPLAY PURPOSES ONLY.       │
                              │ IT IS NOT A REAL SIGNATURE.           │
                              └───────────────────────────────────────┘
ALICE SENDER
DIRECTOR OF SALES, WIDGET INC.   ┌──────────────────────────────────┐
                                 │ ALICE IS THE PERSON WHO WROTE    │
ENCL: PriceQuote.xml             │ THE LETTER AND ASKED FOR         │
                                 │ THE DIGITAL SIGNATURE.           │
                                 └──────────────────────────────────┘
─────────────────────────────────────────────────────────────────────

SIGNATURE REQUESTED BY:    ALICE SENDER       ┌────────────────────┐
SIGNATURE EXECUTED BY:     WIDGET, INC ◄──────│ WIDGET INC. OWNS   │
SIGNATURE DATE AND TIME:   JULY 12, 2000 AT 10:28 AM EST
SIGNATURE REPRESENTATION:  324bgYYY86fvDF78976fFT55&676fC76fvVF
                           &76rv+yg667gt677uytvfkuiUGIYt/7GFGFFgfu
┌─────────────────────────┐ ytfuytfd7vvytg88876fgYYYIUYFtydrydTUYVU
│ ALICE CLAIMS THAT THE   │ YOIUgt66667fGVTVYTIVUYTCYU6vytcuccrr
│ DATE OF THE SIGNATURE   │ ytiuuytcrRTTTYIUYFIVYGCYTCC766rt76fytc
│ IS JULY 12, 2000.       │ cytCYTTTIVTIYVCYTCtyu667fcvytcUYYYUIU
└─────────────────────────┘ YFCVVCCyttfccytr7666u6CCYTIFTFCYCUYT
┌─────────────────────────┐ CYTYT876798asdfhighbut87qewr87t78t78789
│ ACTUAL SIGNATURE IS NOT │ 87TGGYG8G87yGohhjbhjvvSDFgbd4
│ IN HUMAN READABLE FORM. │
│ IT INCLUDES             │
│ THE CERTIFICATION PATH. │
└─────────────────────────┘
SERIAL NUMBER              Za34b2196/3f2Qli61a34zqLx94

FOR A COMPLETE EXPLANATION OF DIGITAL SIGNATURES AND
INSTRUCTIONS ON A PROCEDURE YOU CAN FOLLOW TO VALIDATE THE
DIGITAL SIGNATURE ON THIS DOCUMENT PLEASE REFER TO:
http://www.WidgetIncWeb.com/dsig.htm.
       510          ┌──────────────────────────────────────────┐
                    │ SPECIAL PROGRAMS FOUND AT THE ENCLOSED   │
                    │ HYPERLINK VALIDATE THE DIGITAL SIGNATURE.│
                    └──────────────────────────────────────────┘

FIG. 5

ELECTRONICALLY VERIFIED DIGITAL SIGNATURE AND DOCUMENT DELIVERY SYSTEM AND METHOD

CROSS-REFERENCE TO RELATED APPLICATIONS

This claims priority to and the benefit of U.S. provisional patent application No. 60/237,433, filed Oct. 3, 2000, the entirety of which is incorporated herein by reference.

TECHNICAL FIELD

The present invention relates generally to the secure delivery of digital information, and in particular to secure email messaging for electronic documents.

BACKGROUND

Electronic mail ("email") messaging over communication networks, such as the Internet, has enabled individuals and companies to correspond over great distances at a nominal cost. In addition to routine messages, digital photographs of family members, and other noncritical data, email messages are also capable of transmitting electronic copies of business critical documents (e.g., contracts) and other sensitive information (e.g., price lists, authorization codes). Although Internet email provides great advantages in terms of cost, timeliness (rapid delivery), and flexibility (any type of digital data can be transmitted), Internet email suffers from an inherent lack of security and trustedness, which frustrates email users dealing with sensitive electronic attachments.

Email messages must typically pass through a number of different computers to get from sender to recipient, regardless of whether these computers are located within a single company, on an Intranet for example, or on Internet-attached computers belonging to a multitude of organizations. Unfortunately, any one of these intermediate computers can potentially intercept the message, keep a copy of it, and/or modify its contents. Moreover, even though some email messaging systems have limited "return receipt" capabilities, the email message carrying the receipt confirmation suffers from the same security and reliability problems as the original email message.

In order to mitigate these security issues, mathematically-based, cryptographic techniques have been applied to email messaging systems, which help ensure the privacy of email content at an added cost and complexity to email users and/or system administrators. The typical encryption methodology involves asymmetrically encrypting the sensitive electronic attachment, transferring the encrypted document to a central repository, and then authenticating the recipient to ensure that access by that entity is authorized. Unfortunately, implementation of encryption technology and maintenance of a database of encrypted documents awaiting pickup increases the cost and complexity of doing business. Accordingly, significant effort is being expended to further streamline systems that provide for a secure transfer of electronic documents at a reduced cost.

SUMMARY OF THE INVENTION

The invention addresses the cost and complexity shortcomings of the prior art by providing a confirmed messaging infrastructure and methodology, which enables users to deliver confidential and secure electronic documents and other types of electronic files over the Internet or other communication networks at a reduced cost and complexity. The confirmed email messages of the invention can include electronic document attachments in virtually any format and these electronic documents can be digitally signed and timestamped for authentication and non-repudiation purposes.

The invention employs a broad range of security technologies and procedures to provide 1) confidentiality of document content during transmission over the Internet, 2) authentication of the sender's and recipient's identity, 3) integrity of the document content, 4) execution and subsequent validation of digital signatures on documents by both sender and recipient, and 5) creation and maintenance of an audit trail whose data establishes non-reputable evidence of messaging transactions processed by the invention. The component-based architecture of the invention can be implemented within a company's existing security infrastructure without incurring the cost and time penalties normally encountered when enhancing a company's security environment. The system of the invention is also readily scaleable and accommodates recipients with different messaging capabilities. For example, the invention provides secure messaging services to recipients who have 1) neither proprietary messaging software nor a digital certificate capability, 2) a digital certificate capability, but not proprietary messaging software, and 3) a secure message relay server that employs both digital certificate capability and proprietary software on behalf of individual recipients in an organization, who are not otherwise equipped with such capabilities.

In one embodiment, the invention prevents the repudiation of digitally-signed electronic documents. A message server in accordance with an embodiment of the invention receives, processes and delivers a plurality of electronic documents during a first and second time interval and forms a message digest for each of the plurality of electronic documents by, for example, executing a hashing algorithm on the contents of the electronic documents. At least some of the plurality of electronic documents can correspond to a file attachment in an electronic mail message.

In one embodiment, the first and second time intervals are predetermined, e.g., daily time intervals. Alternatively, the duration of the first and second time intervals can be dynamically determined from a number of electronic documents anticipated during a particular time of day, e.g., a time interval may be set to an hourly basis during periods of elevated email activity and expanded to a multi-hour basis during periods of expected low email activity. The time intervals can also be set according to the time sensitive nature of the electronic documents themselves in order to ensure that the timestamp applied to the message digests of these electronic documents is of sufficient granularity to satisfy the needs of the sender and recipient.

The message digests corresponding to the electronic documents received during the first time interval are further subjected to a hashing algorithm in order to compute a first super-message digest. The hashing algorithm can also be applied to a variety of other data sets in order to compute the first super-message digest, e.g., the message digests for the electronic documents received in the first time interval, a timestamp associated with the first super-message digest, and a prior super-message digest. Similarly a second super-message digest is derived, at least in part, from each of the message digests received during the second time interval and from the first super-message digest.

The invention transmits the first and second super-message digests to an independent timestamp authority in order to obtain a trusted timestamp and the timestamps are subsequently recorded in an audit log together with each of the message digests and the first and second super-message digests. The timestamp associated with the first super-message digest can also be used in combination with the above-mentioned data sets in computing the second super-message digest.

In one embodiment, the invention provides a method of securely delivering an electronic document from a sender to a recipient. A message server associated with the sender of the electronic document computes a symmetric key used to encrypt the electronic document prior to its transmission to the recipient. The electronic document can also be digitally signed either prior to or subsequent to its encryption. In one embodiment, the symmetric key is computed by executing a predefined algorithm, which operates on message parameters associated with the electronic document and on a hidden parameter associated with the message server. The message parameters can include a recipient list and a hash of the contents of the electronic document.

The encrypted electronic document is transmitted, together with its related message parameters, to at least one recipient. The electronic document and message parameters are preferably transmitted to the recipient in an email message. In one embodiment, the message parameters are encoded prior to transmission. In another embodiment, the message parameters are encrypted using a hashing algorithm different from that used to compute the symmetric key.

A web server coupled to the recipient of the encrypted electronic document receives the message parameters that were previously transmitted by the message server to the recipient. In one embodiment, the received message parameters are posted to the web server via an HTML form included in the email message transmitted to the recipient. The web server also receives identification data associated with the recipient, such as the recipient's user ID and password, which was previously registered with the web server.

The web server compares the recipient's identification data with the received message parameters to determine whether or not at least some of the received message parameters match the identification data. If a match is found, the web server dynamically computes the same symmetric key used by the message server to encrypt the electronic document by executing a predefined algorithm on the received message parameters and the hidden parameter associated with the message server.

Since the message server and web server are controlled by the sender of the electronic document, both servers share the same predefined algorithm used to compute the symmetric key as well as the hidden parameter. In this manner, the invention is able to dynamically compute the symmetric key using shared data that is common to both servers as well as the message specific data associated with the electronic document. The symmetric key can then be displayed or otherwise provided to the recipient.

The invention also provides a method of securely delivering an electronic document via a web server. The web server receives not only the parameters associated with the electronic document (e.g., recipient list), but also the encrypted electronic document itself. The contents of the electronic document are transmitted to the web server by either the message server or the recipient. As discussed above, the web server also receives identification data from the recipient via a communications network and compares at least some of the received parameters therewith. Upon matching the identification data and at least some of the received parameters, the web server dynamically computes a symmetric key from the received parameters. The web server subsequently decrypts the encrypted electronic document using the symmetric key and displays the decrypted document on a web page that is accessible to the recipient. The web server can also transmit a delivery confirmation message to the sender of the symmetrically encrypted electronic document, after successfully matching the identification data and the received parameters, so that the sender is informed of the recipient's ability to read and otherwise access the electronic document.

BRIEF DESCRIPTION OF THE DRAWINGS

The foregoing discussion will be understood more readily from the following detailed description of the invention, when taken in conjunction with the accompanying drawings, in which:

FIG. 5 provides an example of a digitally-signed, electronic document;

DETAILED DESCRIPTION

In brief overview, the secure messaging system of the present invention encrypts an electronic document using a symmetric key and transmits the encrypted document and related message parameters to a designated recipient whose identity is then authenticated by a process operating on a web server. A decryption process on the web server dynamically regenerates the symmetric key, at least in part from the message parameters accompanying the encrypted document (the encrypted document itself is not accessed or maintained by the web server), and thus avoids having to maintain a central repository of encrypted documents as required by typical "post and pick-up" encrypted messaging systems.

Further, an audit log produced while practicing the invention provides timestamped, message-digest data for a plurality of time intervals, where the message digests for adjacent time intervals are computationally linked together. The audit log effectively enables timestamped, message-digest data to verify not only the existence of an electronic document during a first time interval, but also to verify the existence of documents encountered in one or more prior time intervals. The timestamped, message-digest data recorded in the audit log is therefore useful in preventing the repudiation of digitally-signed electronic documents. Repudiation of digitally-signed documents may occur, for example, when a digital certificate is compromised and is subsequently invalidated and there is doubt as to whether or not use of the digital signature on a prior occasion had been authorized.

Figure 1:
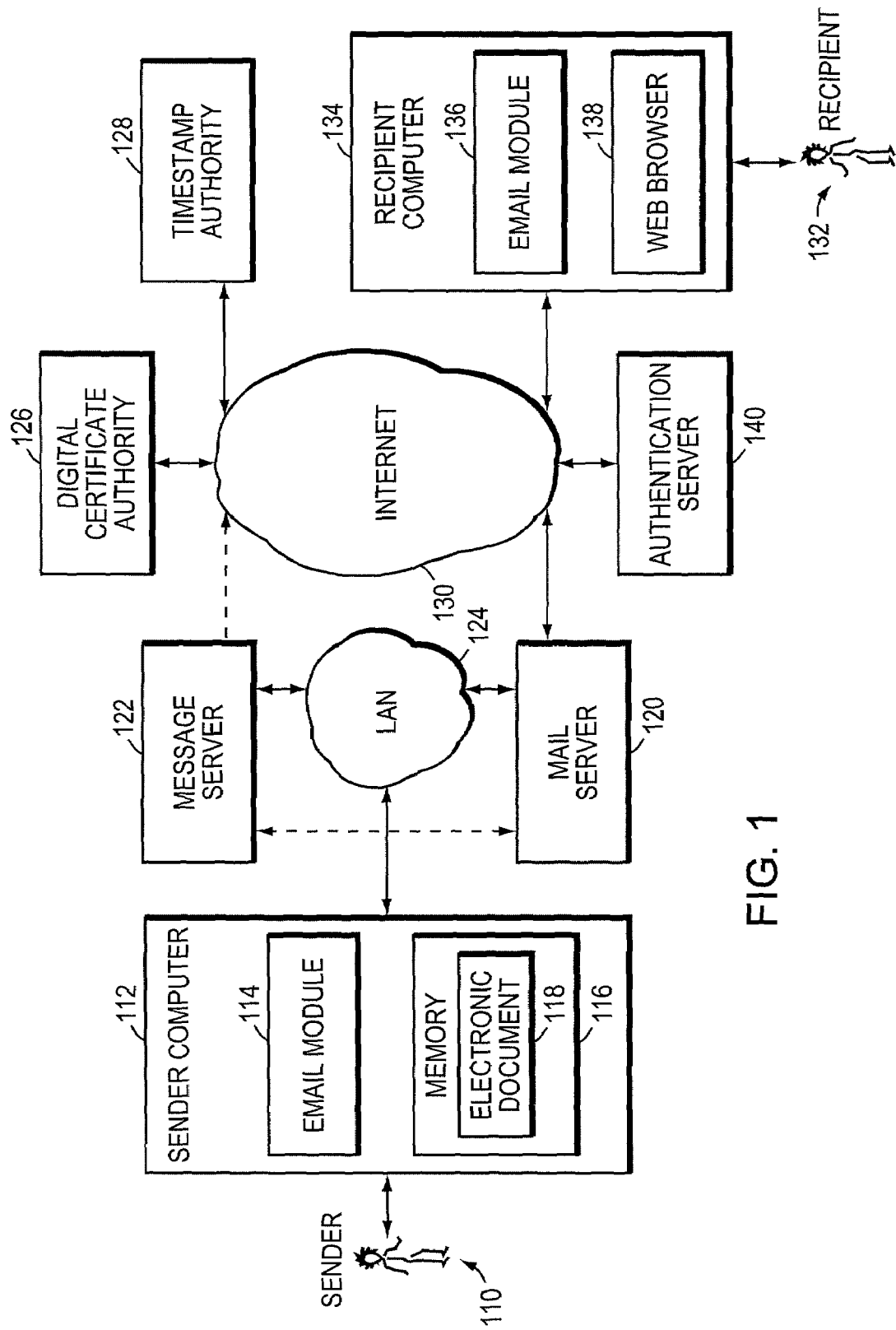
FIG. 1 schematically illustrates the network and logical connections between a sender, mail server, message server, digital certificate and timestamp authorities, authentication server, and recipient in accordance with an embodiment of the secure messaging architecture of the invention.
Figure 2:
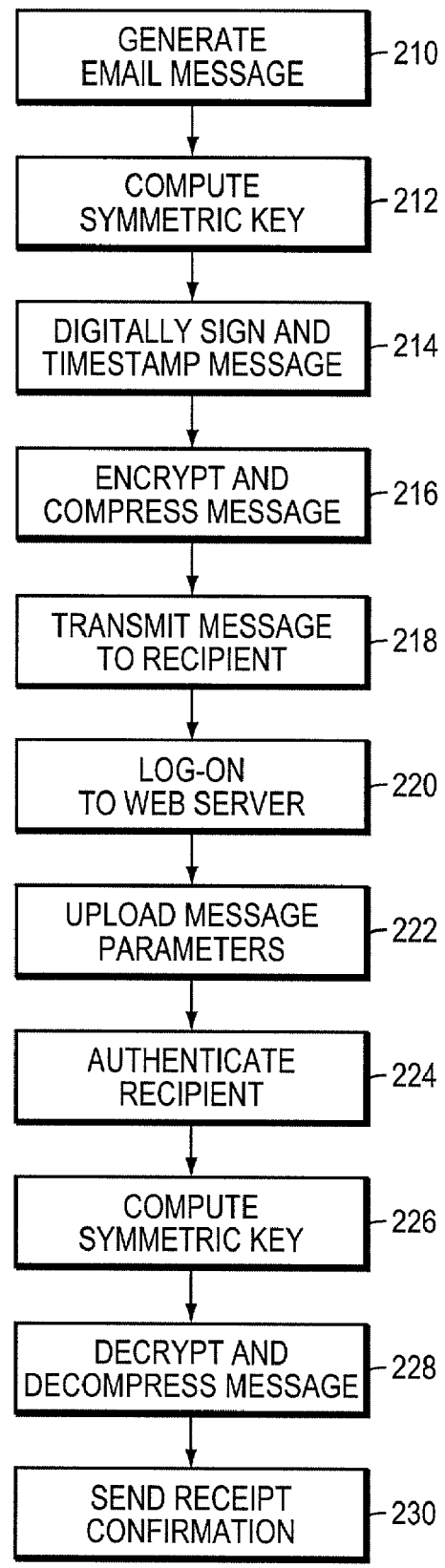
FIG. 2 provides a high-level flow diagram of the steps performed by the message server and authentication server depicted in FIG. 1.

With reference to FIGS. 1 and 2, a sender 110 of an email message initially accesses an email program/module (e.g., Outlook manufactured by the Microsoft Corp. of Redmond Wash.) on the sender's computer 112 in order to generate the email message (step 210). The email message can comprise an electronic document 118, such as a file attachment, stored in a memory 116 coupled to the sender computer 112. The term "electronic document" is broadly defined to encompass a file attachment, the email message itself, and/or any other digital/electronic data transmitted between computers. The email module 114 transmits the email message to a mail server 120, which routes the message to a message server 122 via a network 124, such as a local area network. In one embodiment, the sender computer 112, mail server 120, and message server 122 are in electrical communication with each other via the network 124. In other embodiments, the connections between these entities are direct or may involve a combination of direct and network connections. Those skilled in the art will recognize that the email module 114, mail server 120, and message server 122 can each be present on the same computer and/or be combined such that the functions performed by the message server 122 and mail server 120 are performed by a single entity.

Regardless of the particular architecture used, the message server 122 computes a symmetric encryption key (step 212) for the electronic document 118 and arranges for the electronic document 118 to be digitally signed and timestamped by trusted authorities 126, 128 (step 214). The message server 122 then encrypts the digitally signed and timestamped document using the symmetric key and compresses it using compression algorithms known to those skilled in the art (step 216). The message server 122 forwards the compressed document to the mail server 120, which incorporates the compressed document as a file attachment in an email message and subsequently routes the email message to one or more designated recipients (step 218). The transmitted email message is subsequently received by a recipient computer 134 associated with the recipient 132. The email message is then displayed to the recipient 132 by an email module 136 operating on the recipient computer 134.

In one particular embodiment, the message server 122 inserts the content of the electronic document 118 into a ZIP archive file or renders the content to a PDF document file. The message server 122 then executes an algorithm to form the message-specific symmetric encryption key from 1) a hidden parameter/key (known only by the sender's message server 122), 2) a digest of the contents of the electronic document 118, and 3) the PDF document or ZIP archive. The symmetric key is subsequently applied to the PDF document or ZIP archive in order to encrypt the electronic document 118. The message server 122 can also optionally apply a timestamp and/or a digital signature to the encrypted document and/or to message parameters associated with the encrypted document. The message server 122 then compresses the encrypted and timestamped/digitally-signed document. Alternatively, compression can occur during one or more stages of this message processing methodology, for example, prior to encryption or prior to obtaining the timestamp and digital signature.

In one embodiment, the email message displayed by the email module 136 includes a notification instructing the recipient 132 on how to obtain the appropriate symmetric key that can be used to decrypt and access the contents of the electronic document 118. In one embodiment, these instructions direct the recipient 132 to select a hyperlink displayed within the email message. Upon selection of the hyperlink, a web browser 138 operating on the recipient computer 134 is launched and displays a web page hosted on an authentication web server 140. Alternatively, the instructions direct the recipient 132 to select an HTML form (not shown) displayed by the email module 136, which essentially uploads the message parameters to the authentication server 140. The instruction notification in the email message can also direct the recipient 132 to manually enter the required message parameters on a web page hosted by the authentication server 140.

Regardless of the particular technique used to upload message parameter data to the authentication server 140, the recipient 132 must also log onto the authentication server 140 as a registered user, for example, by entering a user ID and password that was previously registered and communicated to the recipient 132 (step 220). It is important to note that the authentication server 140 is controlled and maintained by the sender 110, the sender's company, or by a third party on behalf of the sender/sending company.

Upon successful login, the authentication server 140 accesses one or more message parameters (which may be encoded in BASE64 for example) associated with the compressed document (step 222). In one embodiment, these message parameters are included as part of the string forming the hyperlink in the email message received by the recipient 132. In another embodiment, the message parameters are automatically posted to the authentication server 140 upon selection of the HTML form in the email message, as discussed above. In yet another embodiment, the message parameters are displayed in the email message and the recipient 132 manually enters these parameters into fields provided on the web page.

The authentication server 140 authenticates the identity of the recipient 132 by 1) comparing the information provided during the login process with a recipient list included as part of the message parameters (step 224) and 2) validating the recipient's login information against a database, directory or other source that contains a list of users authorized to access the authentication server 140. In addition to the email addresses of the designated email recipients (i.e., recipient list), the message parameters further include, for example, the name and other identifying information of the sending company and individual sender, the date and time that the email message was processed, a unique identifier of the email message as determined by the message server 122, a message subject, a length of the symmetric key computed by the message server 122, and/or a digest of the hidden parameter known to the message server 120.

The authentication server 140 applies the same hashing/encryption algorithm used by the message server 122 to encrypt the electronic document 118 to the message parameters in order to compute the symmetric key (step 226). The symmetric key is then displayed to the recipient 132 via the web page hosted by the authentication server 140. The recipient can then decompress and decrypt the received document using this symmetric key (step 228). In one embodiment, the authentication server 140 also sends a receipt confirmation to the sender 110 upon computation of the symmetric key so as to acknowledge that the recipient 132 has successfully been authenticated and has the appropriate access information necessary to read the electronic document 118 (step 230). This receipt confirmation can be provided in response to a query by the message server 122 or upon the occurrence of some other event.

In an alternative embodiment, the encrypted electronic document and message parameters are posted to the authentication server 140, which automatically decrypts and displays the electronic document 118 on the web page displayed on the web browser 138 upon successfully authenticating the recipient's login credentials. In one embodiment, the encrypted document is provided to the authentication server 140 via a transmission by the message server 122 directed to the authentication server 140. Alternatively, the encrypted document can be provided to the authentication server 140 as one of the message parameters posted to the authentication server 140 from the email message received by the recipient 132. The displayed electronic document can then be optionally downloaded to the recipient computer 134.

Figure 3:
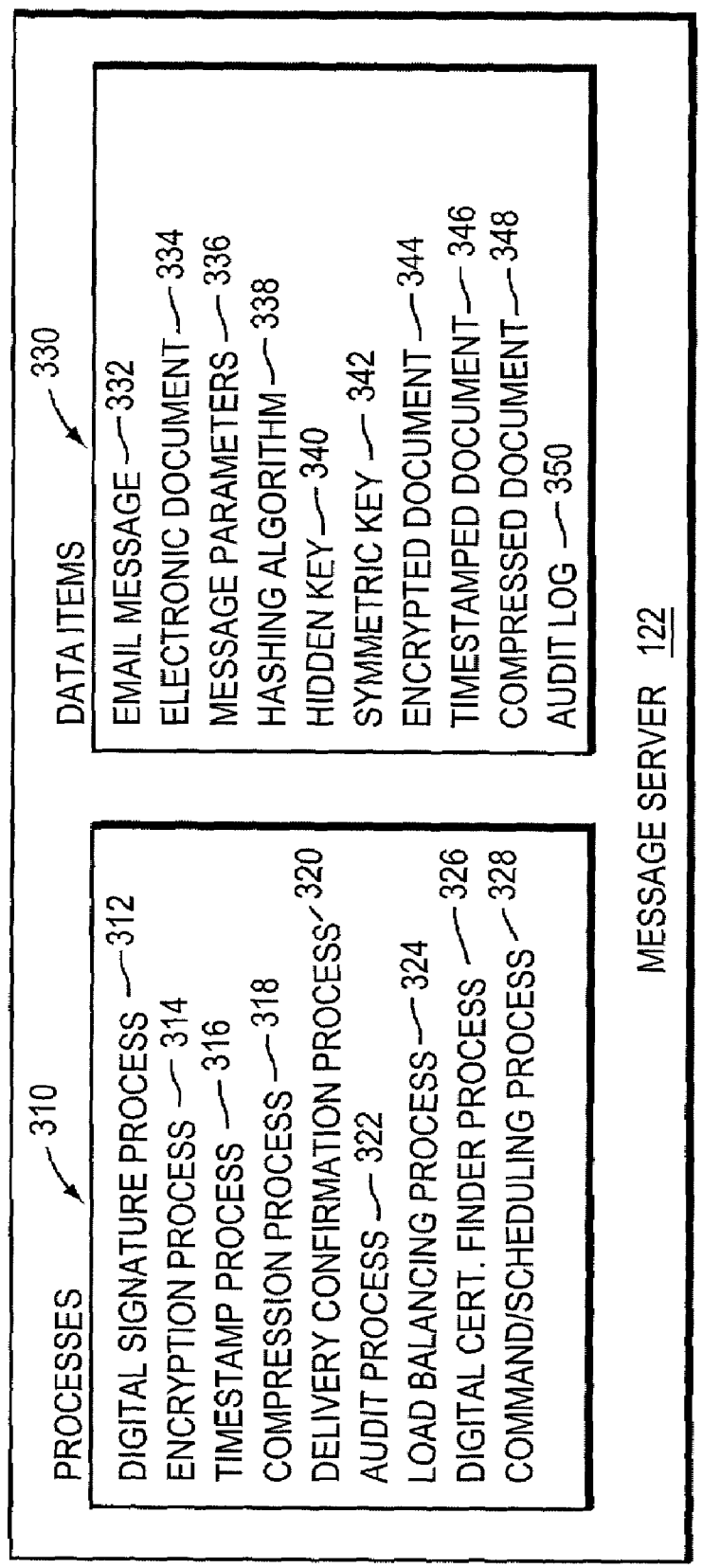
FIG. 3 schematically illustrates several processes operating on the message server of FIG. 1, together with several data items manipulated thereby, in accordance with an embodiment of the invention.
Figure 4:
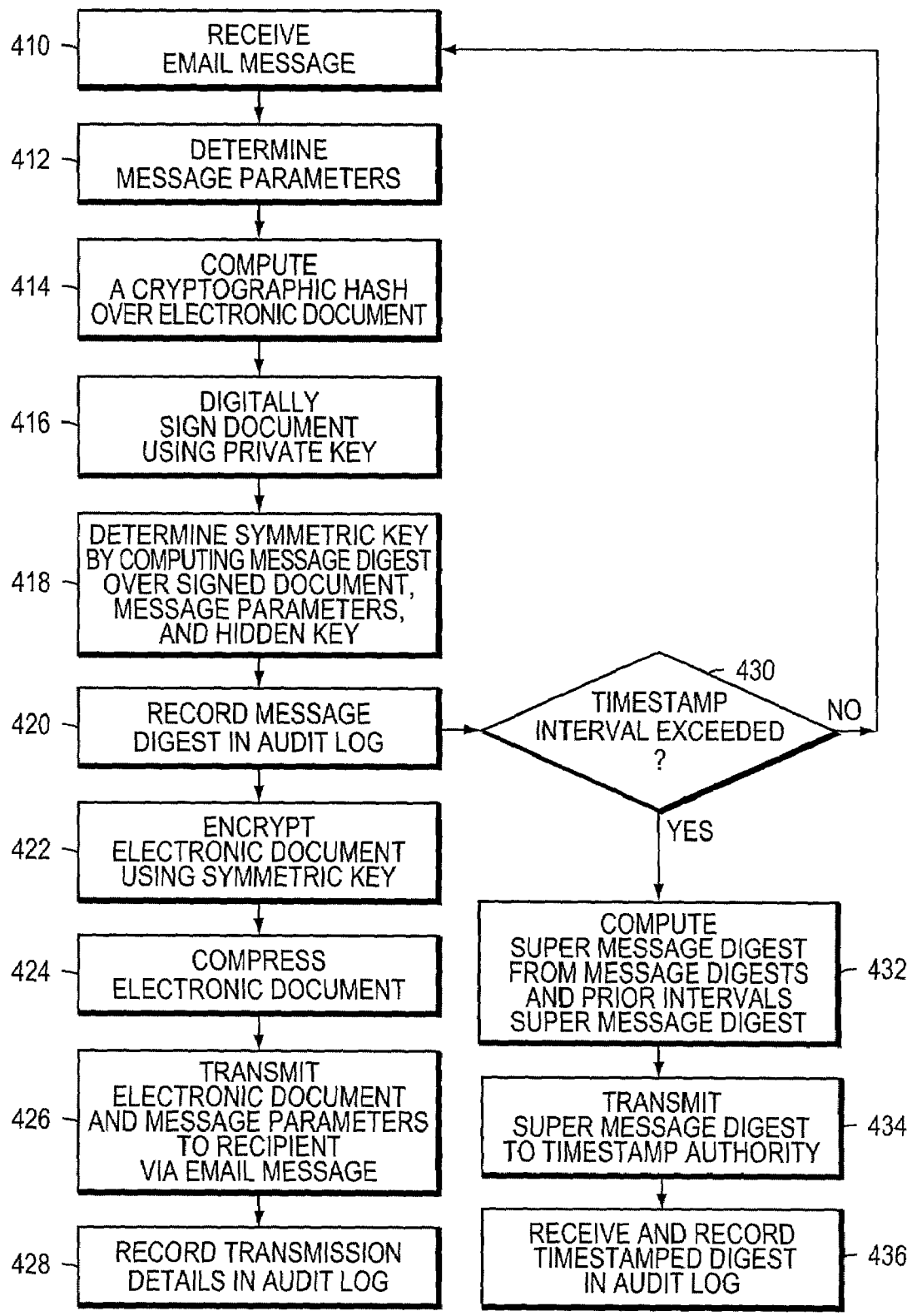
FIG. 4 provides a flow diagram of the steps performed by the processes delineated in FIG. 3, in accordance with an embodiment of the invention.

In more detail and with reference to FIGS. 1, 3, and 4, the message server 122 includes a plurality of processes 310 and data items 330, which facilitate proper processing of the electronic document 118 prior to transmission to the recipient 132. In one embodiment, the message server 122 receives the email message containing the electronic document 118 from the mail server 120 (step 410). The message server 122 determines the message parameters 336, such as the date/time of the email, recipient list and hash digest of the electronic document 118, from the received email message (step 412). The digital signature process 312 of the message server 122 computes a cryptographic hash of the electronic document 118 using, for example, a hashing algorithm 338 that operates on the electronic document 118 (step 414). The digital signature process 312 then digitally signs the electronic document 118 by encrypting the cryptographic hash computed using a private key from an asymmetric keying pair (step 416). The corresponding public key is bound within a signature certificate signed by the digital certificate authority 126 using that authority's private key, as is known to those skilled in the art.

In one illustrative embodiment and by way of nonlimiting example, a sample of a digitally-signed electronic document 334 is depicted in FIG. 5. The long, horizontal line in the electronic document 334 separates the text of the letter from the digital signature. The signature representation is a BASE64 encoded string that contains the actual cryptographic digital signature and supporting information required to validate the signature, such as the signing certificate. The coverage area of the digital signature includes all of the information that the signature secures and even a single bit change in this coverage area would invalidate the digital signature. The coverage area in this illustrative embodiment includes everything on the letter, both above and below the horizontal line, except the signature representation itself. The coverage area can also include information that is not displayed on the letter, such as a process on how to validate the digital signature that is incorporated within the web page behind the hyperlink 510.

In this particular embodiment, Alice instructs the digital signature process 312 to apply a company-wide digital signature controlled by Widget, Inc. rather than use a digital signature specifically assigned to her. In effect, Alice has signed the document on behalf of her company. In this scenario, the digital signature process 312 authenticates Alice as an authorized employee prior to signing the document. This authentication process can be made more secure by incorporating a digital certificate or biometric data assigned to/associated with Alice.

Returning now to FIGS. 1, 3, and 4, an encryption process 314 of the message server 122 determines a symmetric key 342 for the digitally-signed electronic document 334 by applying a hashing algorithm 338 to 1) a message digest previously computed for the signed document 334, 2) one or more message parameters, and 3) a hidden key 340 (step 418). The hidden key 340 corresponds to a unique code associated with the sender 110 or sender's company, which is not disclosed to the recipient 132. As discussed later, both this hidden key 340 and the hashing algorithm 338 are identical to those maintained on the authentication server 140 and serve to ensure that the recipient 132 is unable to decrypt the electronic document 334 using only the message parameters and other information in the email message transmitted thereto. The message digest computed for the signed document 334 is recorded by an audit process 322 in an audit log 350 on the message server 122, together with other related events and data involving the processing and manipulation of the electronic document 118 (step 420).

A timestamp process 316 forwards the message digest computed for the signed document 334 to the timestamp authority 128, which affixes the current date and time to the message digest and digitally signs the result. The timestamped message digest is then recorded in the audit log 350 by the audit process 322 and can be later accessed to show that the electronic document 118 existed at a particular point in time. This timestamp is useful in ensuring that any transactions involving the electronic document 118 will not be repudiated after a potential compromise of the sender's digital certificate in the future.

In one embodiment, the timestamp process 316 evaluates whether a timestamp interval has been exceeded (step 430) before obtaining a timestamp from the timestamp authority 128. If the timestamp interval has not lapsed, then steps 410–430 are repeated until the timestamp interval expires. During the timestamp interval, email messages containing electronic documents continue to be processed, however the timestamp for each of these messages is postponed until a batch of messages can be timestamped at substantially the same time. This batching technique reduces the performance requirements on the communication channel without diminishing the degree of granularity needed to ensure the existence of a document at a particular time. For example, if the electronic document being processed is a contract which requires a digital signature on a particular day, then the degree of granularity required to support this transaction is one day or less.

Upon expiration of the timestamp interval, the timestamp process 316 computes a super-message digest by executing a hashing algorithm on all of the message digests received during the current timestamp interval and on the super-message digest of the prior interval (step 432). The timestamp process 316 then forwards the super-message digest to the timestamp authority 128, which securely timestamps and digitally signs the super-message digest (step 434). The timestamp process 316 receives the timestamped result and forwards it to the audit process 322, which records the timestamped super-message digest in the audit log 350 (step 436). In this manner, the invention ensures that the electronic document 118 existed prior to a particular time and thus helps to avoid its later repudiation (such as when a digital certificate has been compromised and it is unclear which transactions must be nullified). Further, the process of generating a super-message digest from a prior interval's super-message digest ensures that even when a network connection fails or access to the timestamp authority 128 is not effected, that the later interval's timestamped, super-message digest validates the previous period's messages.

Figure 6:
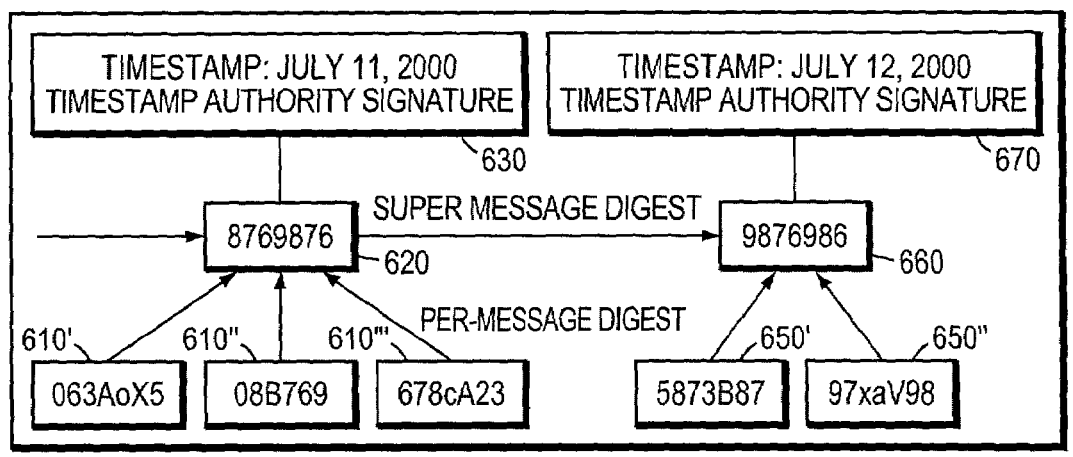
FIG. 6 provides an example of the data flow in computationally-linked, message digests recorded in an audit log of the message server of FIG. 1, in accordance with an embodiment of the invention.

In one illustrative embodiment and with reference to FIG. 6, the encryption process 314 computes a message digest 610', 610", 610''' for each of the three digitally-signed electronic documents 334 received during the daily timestamp interval associated with Jul. 11, 2000. As previously discussed, the timestamp process 316 triggers the computation of a super-message digest 620 for Jul. 11, 2000 by executing a hashing algorithm on the message digests 610', 610", 610''' and on the prior interval's super-message digest (not shown). The super-message digest is then forwarded to the timestamp authority 128 and obtains a timestamped digital signature 630 therefrom. A similar process is performed for the two message digests 650', 650" received in the next timestamp interval resulting in the formation of a super-message digest 660 computed from each of the message digests 650', 650" received during the Jul. 12, 2000 timestamp interval and from the prior period's super-message digest 620. The current super-message digest is then submitted to the timestamp authority 128, which returns a timestamped digital signature 670 that is subsequently recorded in the audit log 350 by the audit process 322.

Returning now to FIGS. 1, 3, and 4 and upon completion of the timestamp activity, the encryption process 314 encrypts the digitally-signed electronic document 334 using the symmetric key 342 (step 422). A compression process 318 then executes a compression algorithm to compress the encrypted document 344 (step 424). The compressed document 348, together with its related message parameters 336, is subsequently transmitted to the recipient 132 via an email message (step 426). The transmission details, such as date/time of transmission, message digest, and message parameters 336 are all recorded in the audit log 350 (step 428).

As discussed, the email message forwarded to the recipient 132 can include either a hyperlink to a web page hosted on the authentication server 140 or an HTML form, along with instructions on how the recipient 132 should proceed in decrypting the encrypted document 344. In one embodiment, the message server 122 includes a load balancing process 324, which determines a least loaded one of a plurality of authentication servers 140 capable of servicing the authentication/decryption request of the recipient 132. The message server 122 also includes a delivery confirmation process 320, which periodically polls the authentication server 140 to obtain its audit log information that essentially confirms the time that the recipient 132 gained access to the decrypted electronic document 118. Further, some or all of the processes 310 operating on the message server 122 may function independently of each other on an event-driven basis. In such a situation, the processes 310 can remain synchronized by accessing common data elements stored within the audit log 330 or in a memory coupled to the message server 122. Alternatively, the message server 122 can include a command/scheduling process 328 that coordinates the activities of the other processes 310 and provides arbitration for access to network and system resources.

Although the invention has been described as involving digitally-signed electronic documents, those skilled in the art will recognize that the system and method of the invention can be applied to all types of electronic documents regardless of whether or not they are digitally signed. For example, a nonsigned document would still be subjected to an encryption process to ascertain its symmetric key, submitted to a timestamp authority to verify its existence at a particular time, encrypted and compressed into an email attachment and transmitted to a designated recipient, etc.

In embodiments where digital signatures are desired and the recipient 132 already has a digital certificate, the message server 122 can also include a digital certificate finder process 326, which automatically locates and validates a recipient's digital certificates (i.e., public keys) and ascertains that recipient's preferences and/or restrictions relating to messaging and encryption. In one embodiment, the digital certificate finder process 326 queries one or more certificate repositories to ascertain whether any such repositories contain digital certificate/public key information (e.g., the public key itself and any related validity period data) associated with the recipient's email address. If the query is successful, the digital certificate finder process 326 loads the public keys in a database and manages these entries to ensure that duplicate keys (which may have been retrieved from several certificate repositories) are removed.

In one embodiment, the digital certificate finder process 326 attempts to locate a recipient's certificates for a given email address only once, for example, upon the first occurrence of that address. In another embodiment, the digital certificate finder process 326 attempts to locate a recipient's certificates on a periodic basis, such as on the number of days that have lapsed since the last search or upon the request of an administrator of the message server 122. Upon locating a recipient's certificate and storing it in the database, the digital certificate finder process 326 can transmit an email message to the recipient that acknowledges the successful search for the certificate and further informs the recipient about the current configuration settings of the certificate and how to modify them.

The digital certificate finder process 326 validates each certificate located to ensure that it is current and valid for use in encryption. In some instances, the certificates may be authorized for use in signing and/or authentication purposes, but not for encryption. In other instances, a previously valid certificate may have been revoked or expired. The digital certificate finder process 326 identifies each of a recipient's certificates as either valid, invalid, or unknown in the certificate database that it maintains. Validation requests can be submitted to the certificate repositories in which they were located when the certificate is first used, every time that the certificate is used, or periodically, based upon the time lapse since the previous validation of the certificate. Validation requests can also be initiated by the digital certificate finder process 326 upon request by the administrator of the message server 122.

The digital certificate finder process 326 essentially optimizes the processes 310 of the message server 122 by fine tuning the digital signature process 312 to digitally sign the electronic document 118 using the recipient's public key and by employing a cryptographic hash function in the encryption process 314 that is supported by the recipient computer 134. In this manner, the message processing occurring at the message server 122 and on the recipient computer 134 improves the compatibility between the sender and recipient's infrastructure and reduces the occurrence of failed decryption attempts.

Figure 7:
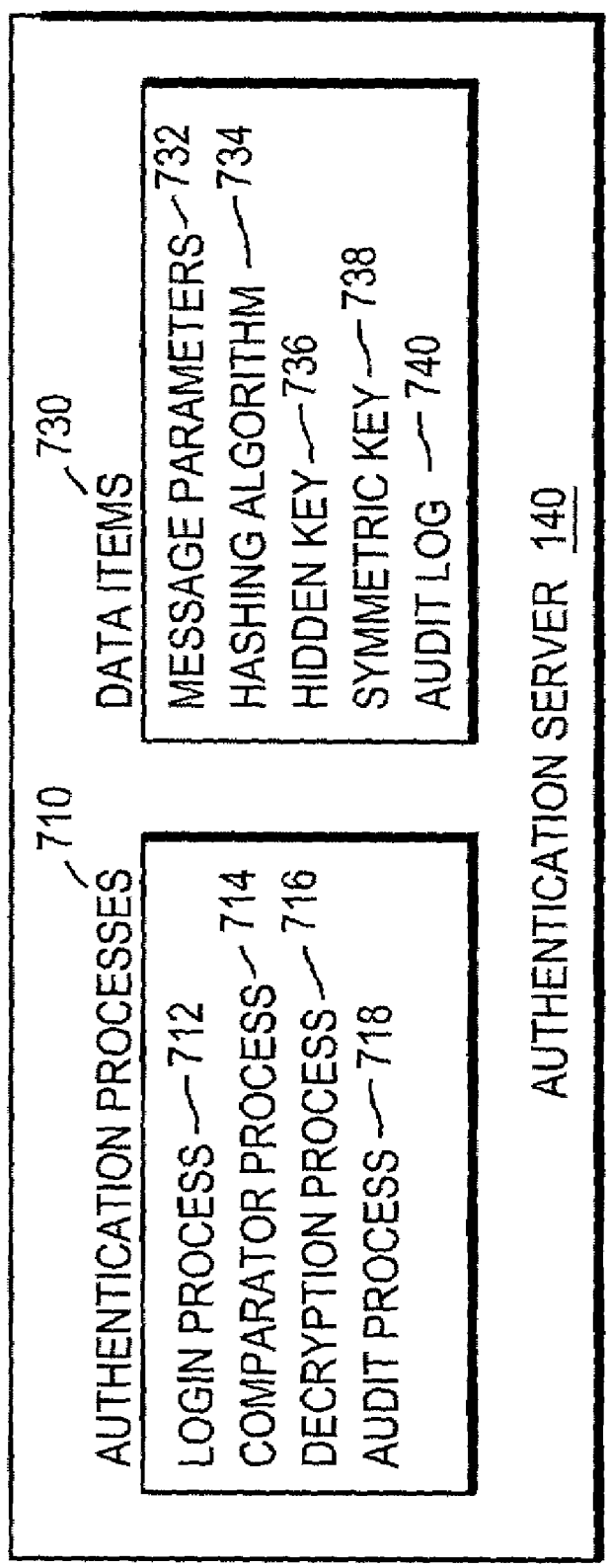
FIG. 7 schematically illustrates several processes operating on the authentication server of FIG. 1, together with several data items manipulated thereby, in accordance with an embodiment of the invention.
Figure 8:
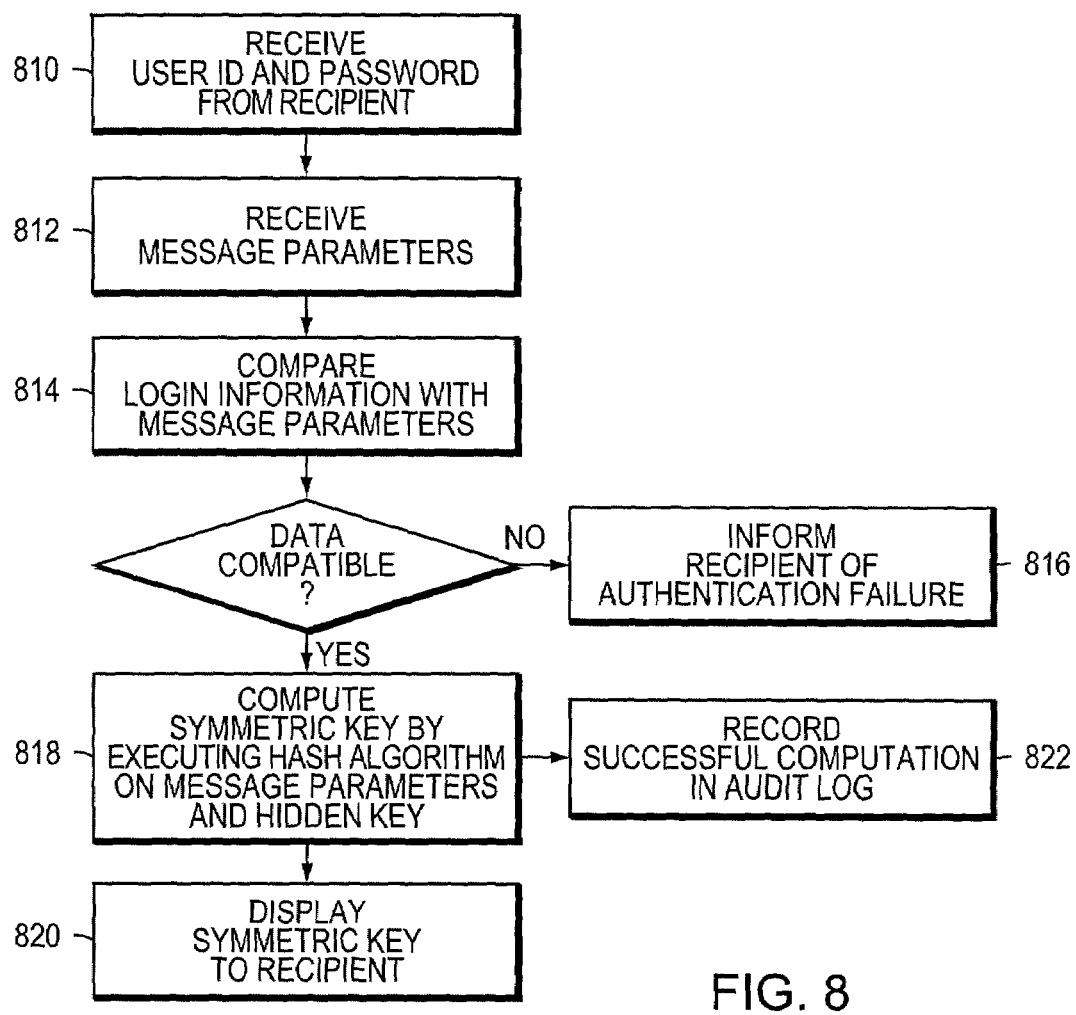
FIG. 8 provides a flow diagram of the steps performed by the processes delineated in FIG. 7, in accordance with an embodiment of the invention.

As discussed above in connection with FIG. 2, the recipient 132 receives the email message containing the compressed and encrypted electronic document 348 and selects the hyperlink or HTML form identified therein to launch the web browser 138 in order to display a particular web page on the authentication server 140. This web page corresponds to a login screen for the authentication server 140. With reference now to FIGS. 7 and 8, the authentication server 140 includes a plurality of authentication processes 710 and data items 730 used to authenticate the recipient 132 and generate the symmetric key 738 necessary to decrypt the compressed electronic document 348 in the received email message.

More particularly, a login process 712 of the authentication server 140 receives a user ID and password input by the recipient (step 810). The login process 712 compares the received login information with the previously assigned login information to confirm that the recipient 132 has authorized access to the authentication server 140. A comparator process 714 receives the message parameters 732 included with the email message received by the recipient 132 (step 812). In one embodiment, the message parameters 732 received by the comparator process 714 are identical to the message parameters 336 of the message server 122. In another embodiment, the message parameters 732 received are a subset of the message parameters 336 of the message server 122. As discussed, the message parameters 732 include the recipient list of the email message, the date/time that the email message was formed or transmitted and a message digest associated with the digitally-signed electronic document 334.

The comparator process 714 compares the message parameters 732 to the login information to determine whether the recipient 132 who provided both sets of data is the intended recipient of the email message (step 814). If the two sets of data are not compatible, then the comparator process 714 informs the recipient 132 of an authentication failure (step 816). However, if the two sets of data are compatible, then a decryption process 716 on the authentication server 140 computes a symmetric key 738 by executing a hashing algorithm 734 on the message parameters 732 and on a hidden key 736 (Step 818). The hashing algorithm 734, message parameters 732, hidden key 736, and symmetric key 738 of the authentication server 140 are preferably identical to the hashing algorithm 338 (FIG. 3), message parameters 336, hidden key 340 and symmetric key 342 of the message server 122. The symmetric key 738 is then displayed on a web page hosted on the authentication server 140 so that the recipient can use it to decrypt the electronic document 348 contained in the received email message (step 820). In this manner, the invention enables an authorized recipient to read an encrypted document without having to maintain a database of encrypted documents as in typical store and forward implementations.

Note further that, upon successful computation of the symmetric key 738, an audit process 718 operating on the authentication server 140 records the successful computation in an audit log 740. The entry in the audit log 740 essentially provides confirmation that the email message containing the electronic document 348 has been successfully delivered to and is decryptable by the recipient 132. In one embodiment, the delivery confirmation process 320 of the message server 122 periodically polls the audit process 718 of the authentication server 140, which responds by transmitting the audit log 740 to the delivery confirmation process 320. Alternatively, the audit process 718 of the authentication server 140 can transmit the audit log 740 to the delivery confirmation process 320 of the message server 122 when the successful computation of the symmetric key 738 is first recorded in the audit log 740 or it can transmit the audit log 740 on a periodic basis.

Although the present invention has been described with reference to specific details, it is not intended that such details should be regarded as limitations upon the scope of the invention, except as and to the extent that they are included in the accompanying claims.

What is claimed is:

1. A method of preventing the repudiation of digitally-signed electronic documents, the method comprising:
   receiving a plurality of electronic documents during a first and second time interval;
   forming a message digest for each of the plurality of electronic documents;
   forming a first super-message digest derived at least in part from each of the message digests received during the first time interval;
   forming a second super-message digest derived at least in part from each of the message digests received during the second time interval and from the first super-message digest;
   transmitting the second super-message digest to a timestamp authority and receiving a timestamp therefrom; and
   recording each of the message digests, first and second super-message digests, and timestamp in an audit log,
   wherein at least one of the plurality of electronic documents corresponds to a file attachment in an electronic mail message.

2. A method of preventing the repudiation of digitally-signed electronic documents, the method comprising:
   receiving a plurality of electronic documents during a first and second time interval;
   forming a message digest for each of the plurality of electronic documents;
   forming a first super-message digest derived at least in part from each of the message digests received during the first time interval;
   forming a second super-message digest derived at least in part from each of the message digests received during the second time interval and from the first super-message digest;
   transmitting the second super-message digest to a timestamp authority and receiving a timestamp therefrom; and
   recording each of the message digests, first and second super-message digests, and timestamp in an audit log,
   wherein the first and second time intervals are predetermined.

3. A method of preventing the repudiation of digitally-signed electronic documents, the method comprising:
   receiving a plurality of electronic documents during a first and second time interval;
   forming a message digest for each of the plurality of electronic documents;
   forming a first super-message digest derived at least in part from each of the message digests received during the first time interval;
   forming a second super-message digest derived at least in part from each of the message digests received during the second time interval and from the first super-message digest;
   transmitting the second super-message digest to a timestamp authority and receiving a timestamp therefrom; and
   recording each of the message digests, first and second super-message digests, and timestamp in an audit log,
   wherein the duration of the first and second time intervals are dynamically determined from a number of electronic documents anticipated during a particular time of day.

4. A method of preventing the repudiation of digitally-signed electronic documents, the method comprising:
  receiving a plurality of electronic documents during a first and second time interval;
  forming a message digest for each of the plurality of electronic documents;
  forming a first super-message digest derived at least in part from each of the message digests received during the first time interval;
  forming a second super-message digest derived at least in part from each of the message digests received during the second time interval and from the first super-message digest;
  transmitting the second super-message digest to a timestamp authority and receiving a timestamp therefrom;
  recording each of the message digests, first and second super-message digests, and timestamp in an audit log; and
  recording a timestamp associated with the first super-message digest in the audit log,
  wherein the second super-message digest is further derived from the timestamp associated with the first super-message digest.

5. The method of claim 4 wherein the second super-message digest is further derived from the timestamp associated with a prior super-message digest.

6. A computer-readable medium comprising code that prevents the repudiation of digitally-signed electronic documents, the code performing the steps of:
  receiving a plurality of electronic documents during a first and second time interval;
  forming a message digest for each of the plurality of electronic documents;
  forming a first super-message digest derived at least in part from each of the message digests received during the first time interval;
  forming a second super-message digest derived at least in part from each of the message digests received during the second time interval and from the first super-message digest;
  transmitting the second super-message digest to a timestamp authority and receiving a timestamp therefrom; and
  recording each of the message digests, first and second super-message digests, and timestamp in an audit log,
  wherein at least one of the plurality of electronic documents corresponds to a file attachment in an electronic mail message.

7. A computer-readable medium comprising code that prevents the repudiation of digitally-signed electronic documents, the code performing the steps of:
  receiving a plurality of electronic documents during a first and second time interval;
  forming a message digest for each of the plurality of electronic documents;
  forming a first super-message digest derived at least in part from each of the message digests received during the first time interval;
  forming a second super-message digest derived at least in part from each of the message digests received during the second time interval and from the first super-message digest;
  transmitting the second super-message digest to a timestamp authority and receiving a timestamp therefrom; and
  recording each of the message digests, first and second super-message digests, and timestamp in an audit log,
  wherein the first and second time intervals are predetermined.

8. A computer-readable medium comprising code that prevents the repudiation of digitally-signed electronic documents, the code performing the steps of:
  receiving a plurality of electronic documents during a first and second time interval;
  forming a message digest for each of the plurality of electronic documents;
  forming a first super-message digest derived at least in part from each of the message digests received during the first time interval;
  forming a second super-message digest derived at least in part from each of the message digests received during the second time interval and from the first super-message digest;
  transmitting the second super-message digest to a timestamp authority and receiving a timestamp therefrom; and
  recording each of the message digests, first and second super-message digests, and timestamp in an audit log,
  wherein the duration of the first and second time intervals are dynamically determined from a number of electronic documents anticipated during a particular time of day.

9. A computer-readable medium comprising code that prevents the repudiation of digitally-signed electronic documents, the code performing the steps of:
  receiving a plurality of electronic documents during a first and second time interval;
  forming a message digest for each of the plurality of electronic documents;
  forming a first super-message digest derived at least in part from each of the message digests received during the first time interval;
  forming a second super-message digest derived at least in part from each of the message digests received during the second time interval and from the first super-message digest;
  transmitting the second super-message digest to a timestamp authority and receiving a timestamp therefrom;
  recording each of the message digests, first and second super-message digests, and timestamp in an audit log; and
  recording a timestamp associated with the first super-message digest in the audit log,
  wherein the second super-message digest is further derived from the timestamp associated with the first super-message digest.

10. The computer-readable medium of claim 9 wherein the second super-message digest is further derived from the timestamp associated with a prior super-message digest.

* * * * *